March 27, 1951  R. W. ANDERSON  2,546,290
WALL STRUCTURE
Filed March 11, 1944  5 Sheets-Sheet 2
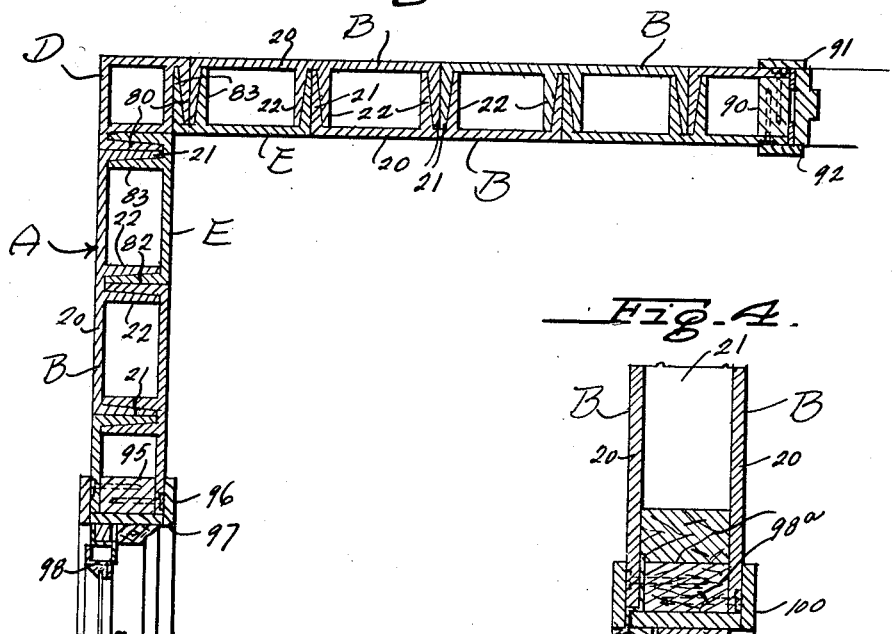
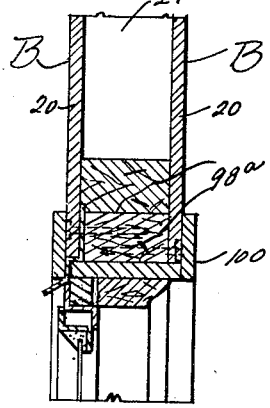
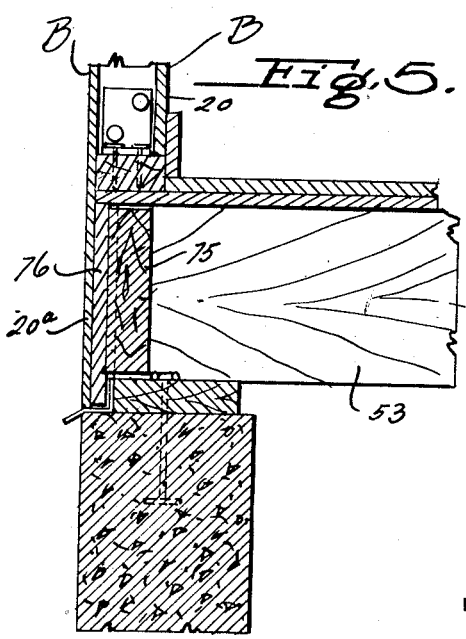
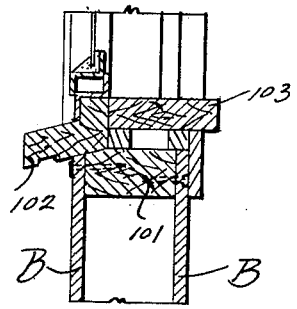
INVENTOR.
Roy W. Anderson.
BY
ATTORNEYS.

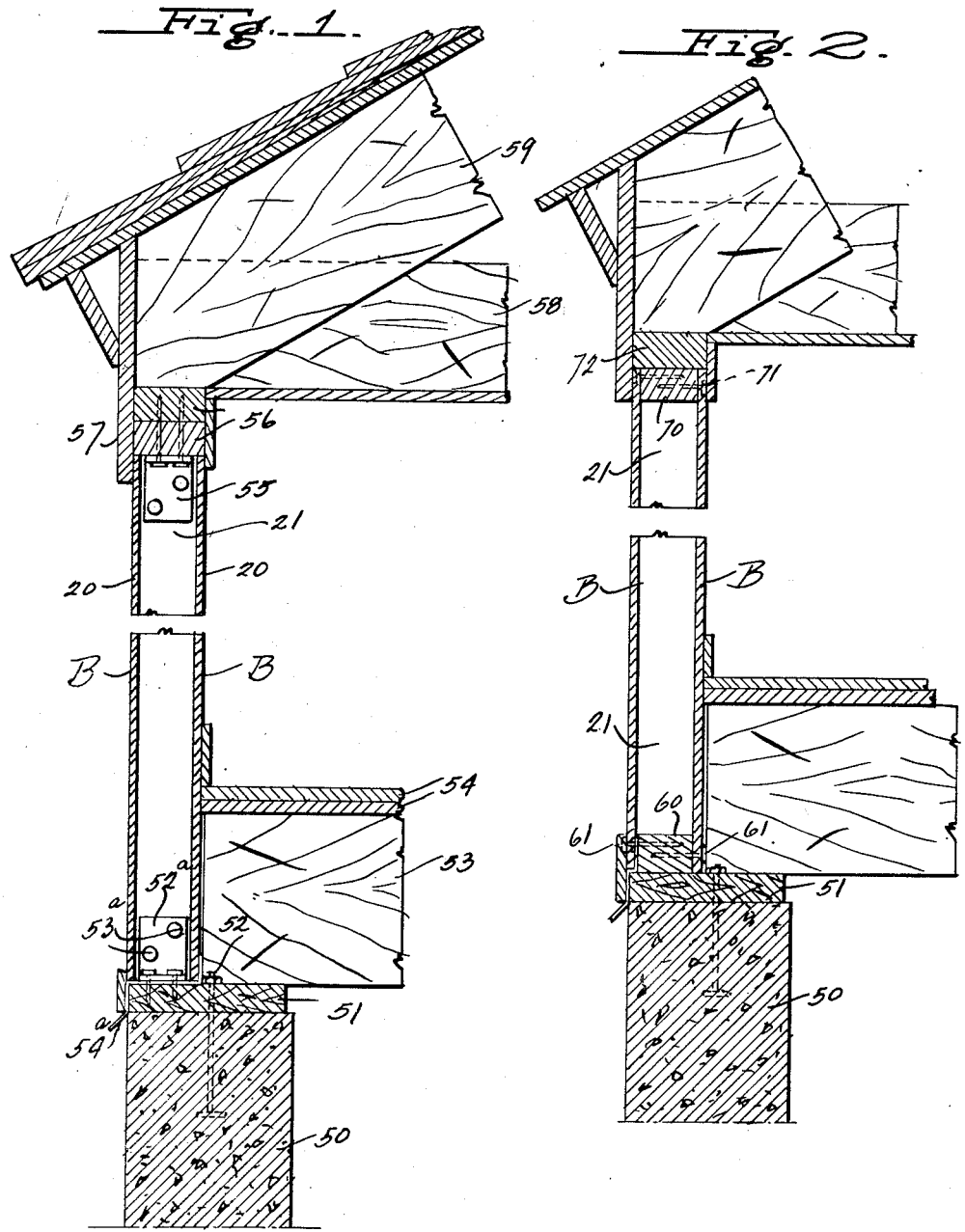

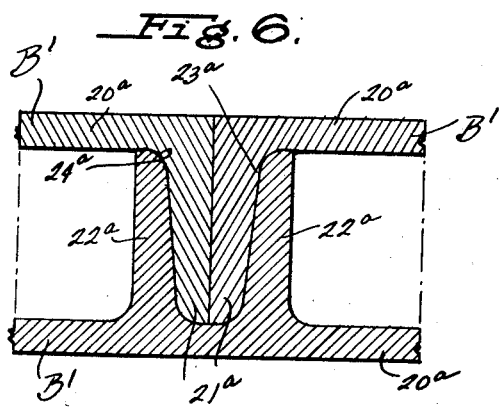
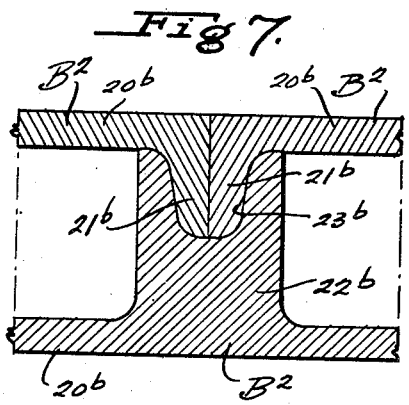
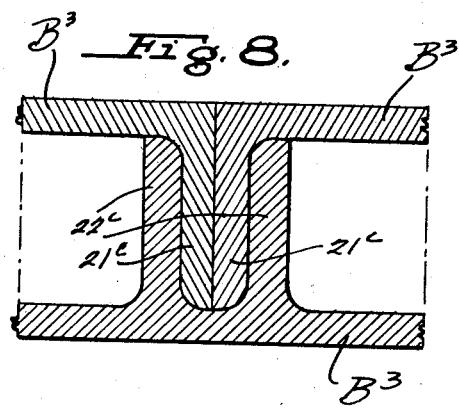
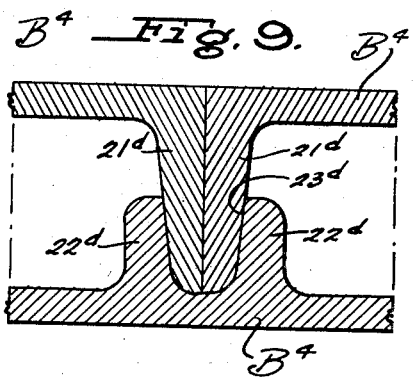
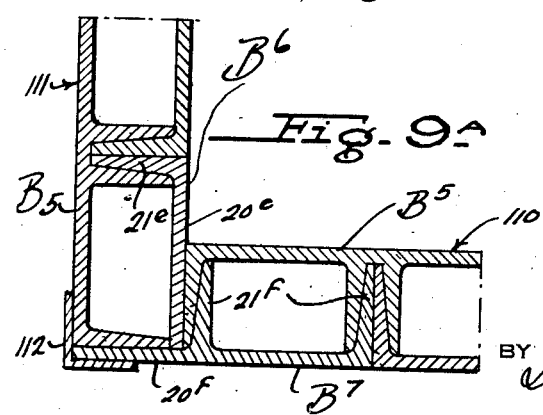

March 27, 1951  R. W. ANDERSON  2,546,290
WALL STRUCTURE

Filed March 11, 1944  5 Sheets-Sheet 4

INVENTOR.
Roy W. Anderson.
BY Lancaster, Allwine и Rommel
ATTORNEYS.

March 27, 1951 R. W. ANDERSON 2,546,290
WALL STRUCTURE
Filed March 11, 1944 5 Sheets-Sheet 5
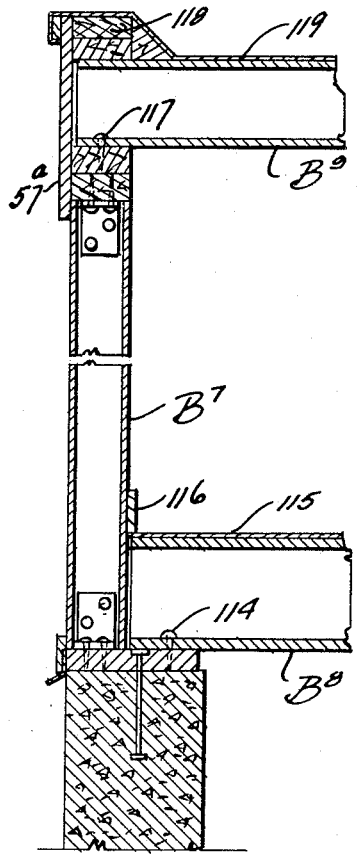
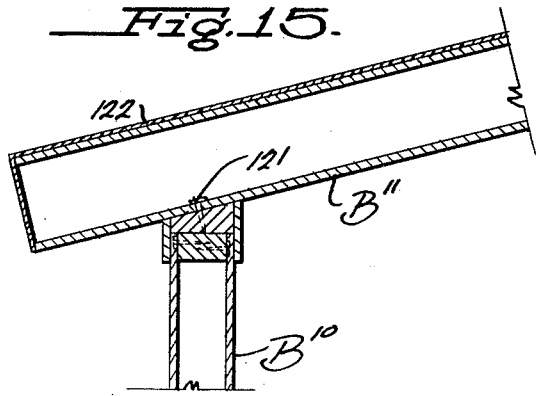
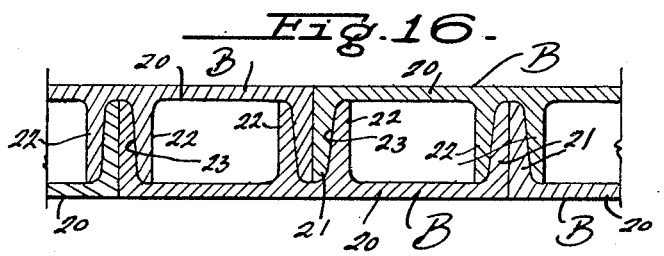
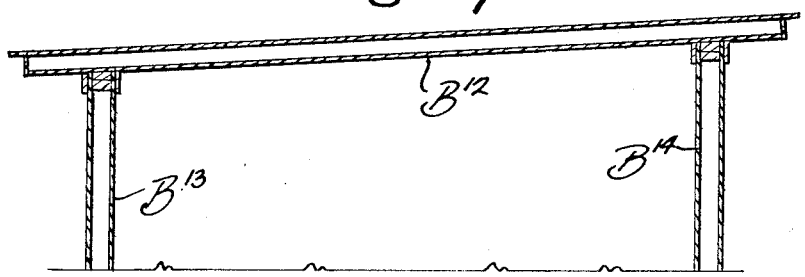
INVENTOR.
Roy W. Anderson.
BY Lancaster, Allwine and Rommel
ATTORNEYS Patented Mar. 27, 1951

2,546,290

UNITED STATES PATENT OFFICE 2,546,290

WALL STRUCTURE

Roy W. Anderson, St. Joseph, Mich.

Application March 11, 1944, Serial No. 526,027

3 Claims. (Cl. 20—4)

This invention relates to improvements in building constructions.

The primary object of this invention is the provision of an improved construction adaptable for walls, roofs and floors formed of conventional wall-boarded materials of a composition nature, known generally as wallboard, fibreboard, composition board, etc., which may be economically fabricated, and which can be quickly and efficiently assembled to provide a weather-tight wall structure having sufficient strength to serve, in itself, as studding for supporting floor, roof and other loads.

A further object of this invention is the provision of an improved wall construction for buildings formed of complementary inner and outer wall sections having improved interconnecting means which will admit of said wall sections being assembled in spaced relation so as to provide a strong weather-proofed wall structure in which the spaces run the height of the wall as an insulation aid and for reception of utilities, such as pipes, plumbing, conduits, wiring, etc.

A further object of the invention is the provision of improved means for connecting inner and outer wall spaced sections of a building.

Other objects and advantages of this invention will be apparent during the course of the following detailed description.

In the accompanying drawings, forming a part of this specification and wherein similar reference characters designate corresponding parts thruout the several views, Figure 1 is a fragmentary vertical section taken thru a building structure showing the improved wall construction mounted upon a foundation and supporting and associated with floor and roof structures.

Figure 2 is a similar cross section showing a modified means of attaching the improved wall structure to a foundation and roof structure.

Figure 3 is a horizontal sectional view taken thru a corner of a wall constructed according to this invention and showing associated door and window details.

Figure 4 is a fragmentary vertical sectional view taken thru a window structure showing how the improved wall is associated with details thereof.

Figure 5 is a fragmentary sectional view taken thru a modified form of wall structure and its connection with the floor and foundation of a building.

Figures 6 to 12 inclusive (not including Figure 9A) show various forms of interfitting connections between sections of a wall structure and means for securing them in place.

Figure 9A is a modified form of corner connection for connected walls.

Figure 12:
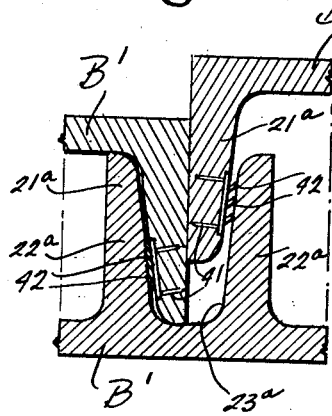
Figure 13:
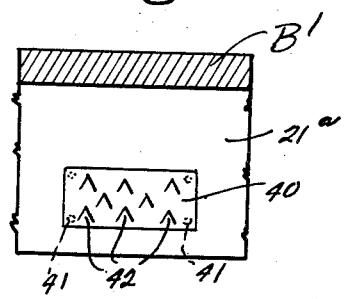

Figure 13 is a fragmentary sectional view showing a detail of the wallboard connecting means of Figure 12.

Figure 14 shows the application of the improved wallboard to a built up type of flat roof and a floor structure.

Figure 15 shows the application of the wallboard to a slanted roof structure.

Figure 16 is a cross sectional view which shows the interconnected relation of the wallboard members to form either a vertical wall, partition, roof or floor structure.

Figure 17 is a view showing rather diagrammatically the application of the wallboard to the formation of a roof structure.

In the drawings, wherein for the purpose of illustration are shown preferred and modified forms of the invention, the letter A may generally designate a wall structure formed of wall panels or sections B in an improved connected relation.

In its simplest form the wallboard, constructed of fibre or any approved composition, is of a desired length and width, altho within the objects of this invention special wall panels incorporating the novelty of the invention may be provided differing in structure from the panel or section B as herein described.

The wallboard or panel B preferably comprises a wall providing body 20 having transversely thereon, preferably normal to the inner surface thereof, projections of a nature to interfit with other projections of a complementary panel or panels, as will be subsequently described.

As shown in the drawings, the panel B has the body portion 20 thereof provided with right angled tongues, ribs or flanges 21 along the longitudinal edges thereof running lengthwise the entire height of the panel body 20. Between the flanges 21 there are similarly provided a pair of relatively spaced ribs, tongues or flanges 22 defining a socket 23 which is adapted to receive a pair of the interfitting tongues or members 21 of complementary panels making up a wall structure, as shown in the drawings.

It is the purpose of the invention to provide a wall construction having relatively spaced inner and outer walls made up of the panels or bodies 20 above described, maintained in spaced assembled relation by the interfitting connection of the tongues or flanges 21 and 22, as shown in Figure 3 of the drawings.

As shown in Figure 6, the inner wall panel B¹ is provided with closely spaced flanges 22ª defining a socket 23ª. The facing surfaces of the flanges or ribs 22ª are convergent towards the body 20ª of the panel and the extreme corners of the flanges 22ª may be rounded as at 24ª. The outside wall panels B¹ are also provided with tongues 21ª, which may appropriately be designated as ribs or flanges adapted to fit in the socket 23ª. The facing surfaces of these flanges 21ª are normal to the outside surface of the panel body 20ª and the remote faces of the tongues 21ª are inclined to snugly abut and interfit in a complementary relation against the tapered surfaces of the tongues or flanges 22ª, as shown in Figure 6.

In the form of invention shown in Figure 7, the panels B², centrally between the edges thereof, may be provided with a relatively sturdy flange or projection 22ᵇ defining a shallow socket 23ᵇ therein opposite the body 20ᵇ of the panel, adapted to receive short flanges 21ᵇ along the longitudinal edges thereof.

In the form of invention shown in Figure 8, the complementary wallboards or panels B³ are provided with straight surfaced end tongues or flanges 21ᶜ and the intermediate socket providing straight faced flanges 22ᶜ adapted to receive the flanges 21ᶜ of complementary panels in an interfitting assemblage.

In the form of invention shown in Figure 9, the panels B⁴ between their vertical or longitudinal side edges, are provided with relatively short tongues 22ᵈ defining the tapered socket 23ᵈ adapted to receive the ends of the longer edge provided tongues or ribs 21ᵈ. It is of course understood that the longer tongues 21ᵈ are provided along each edge of the panels B⁴ and the shorter tongues 22ᵈ are placed in socket providing relation between the flanges 21ᵈ. The complementary tongues 21ᵈ of adjacent panels B⁴ define a tapered tongue adapted to seat in the tapered socket 23ᵈ, as shown in Figure 9.

Means may be provided for maintaining the assembled relation of these interfitting members or tongues of the inner and outer wall sections of the wall structure. Such means may generally partake of the means shown in Figures 10 to 13 inclusive, altho various other anchoring expedients may be substituted in lieu thereof.

Figure 10:
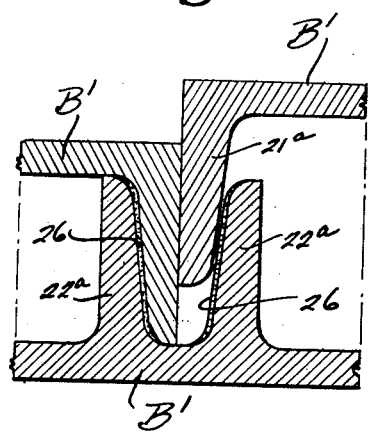

As shown in Figure 10, the wall panel type B¹ of Figure 6, has the facing surfaces of the tongue 22ª provided with an adhesive, designated at 26, which upon moistening at the time of assemblage of the wall structure, will grip the facing surfaces of the tongues 21ª adapted to interfit therein, as shown in the drawings.

Figure 11:
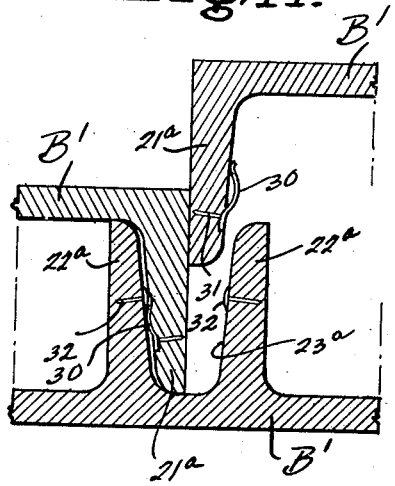

In the form of positive connection shown in Figure 11, spring clips 30 may be secured as at 31 upon the sloping inner faces of the end flanges 21ª; bowed outwardly slightly and adapted to be compressed as the flanges 21ª are slid into the socket 23ª. The tongues 22ª are provided with convex projections 32, in the nature of the head of a nail, upon the facing sloping surfaces defining the tapered socket 23ª, at a point which will permit the clip 30 to slide therepast as the flanges 21ª are slid into interfitting relation in the socket 23ª. This will lock said flanges 21ª in a seated secured relation in the socket 23ª, as is apparent.

In the form of connection shown in Figures 12 and 13, the panels B¹ have the sloping inner surfaces of the connecting members, ribs or flanges 21ª thereof provided with saw tooth clip plates 40 secured as at 41 thereupon and providing anchor teeth 42 normally projecting beyond the inside surfaces of these legs 21ª and adapted to bite into the material of the facing surfaces of the tongues or flanges 22ª defining the socket providing flanges or ribs of the panels B¹. It is perfectly apparent that as the flanges 21ª are assembled in the socket 23ª, the teeth 41 will be distorted, and since they slope upwardly, will bite into the fibre or composition material of the wall panel flanges 22ª when the flanges 21ª are securely seated in the socket 23ª, to prevent disconnection of the inner and outer wall panels.

It will be apparent to those skilled in the art that the principle of assemblage of the inner and outer wall panels of this invention may be adapted in a variety of ways to foundations, floors, and roof structures as well as door and window openings. I have designated, merely by way of example, various means for securing these wallboards or panels to associated building structures. As shown in Figure 1, a foundation wall 50 is provided, having a wall plate 51 anchored thereon at 52 and supporting thereon the usual floor joist 53, and finish and sub-flooring 54.

The wall panels B are assembled as shown in Figure 3, with the tongues and ribs interfitting as above described in connection with Figures 6 to 12 inclusive, depending upon the type of tongue structure desired; the lower ends of the panels B resting upon the wall plate 51 and preferably being anchored thereto by clips 52ª having securing elements secured in the plate 51 and to the tongues 21 and 22, by securing elements 53ª, as shown in Figure 1 of the drawings. Conventional flashing 54ª may be provided, as shown. The roof structure is supported upon the walls formed of the panels B, assembled as above described, by securing clips 55 to the assembled tongue structures 21 and 22; it being understood that a wall structure formed by the panels B when they are assembled will admit of the securing of these clips 52 and 55 in place, since the spaces between the complementary inner and outer wall bodies of the panels may be open at the ends of the wall structure. It is of course possible to secure these clips 52 and 55 in place before the inner or outer panel of the complementary wall structure is completely assembled, as will be well understood by those skilled in the art to which this invention relates. The upper clips 55 are secured to double plates or headers 56, to which the fascia 57 is connected and which also receive the ceiling joist 58 and roof rafters 59, etc.

In the structure shown in Figure 2, the panels B at the lower ends of the walls formed thereof, receive sole plates or boards 60 continuous thruout the length of the wall; the flanges 21 and 22 of course being cut to accommodate the continuous sole plate or runner 60, which is secured to the inner and outer bodies of the wall panels by securing elements 61. The sole plate 60 of course rests upon the foundation plate 51, as shown. Similarly, at the top of the structure formed by the panels B, I provide a lower header plate 70 of a continuous nature; the flanges 21 and 22 being cut to provide for such continuity; the said header 70 being secured in place to the wall panels by securing elements 71. A top plate or header 72 may be secured upon the header 70 and over the top edges of the wall panels, as shown in Figure 2. The roof structure including joists and rafters may be secured to these headers in the manner shown in Figure 2.

In another form of assemblage which is somewhat similar to the form shown in Figure 1, the floor joists 53 at the ends thereof are provided with runners 75 to which sheathing may be outwardly connected, as at 76. The sheathing lies inwardly of the plane of the outermost wall bodies of the panels B, and these wall bodies, designated at $20^a$ in Figure 5, extend down over the sheathing 76 and terminate at the flashing drip.

It will be apparent to those skilled in the building trade that special corner sections may be necessary. For a right angled corner the type of section shown at D in Figure 3 of the drawings may be provided. It comprises an elongated box-like body structure provided with spaced assemblage tongues 80. Associated therewith are special panel sections E at the insides of the wall structure, each of which is provided with a single tongue 82 and a double tongue 83 providing a socket adapted to receive the tongues 80 of the corner pieces D and a complementary tongue of one of the conventional panel sections B above described. It is of course understood that the special panels E may be fabricated by cutting off part of the body 20 of one of the conventional panel sections B, beyond the socket providing double tongue 22.

In order to accommodate windows and doors, the panels B will have to be cut, at the desired place, and in the space between the inner and outer wall bodies are disposed plates or members which are secured therein as by nailing. Thus, as shown in Figure 3, certain panels B are cut to permit of the placement of a plate 90 therein secured as by nailing 91. The door jamb structure 92 may be completed in any approved manner. Also, as shown in Figure 3, where it is desired to provide a window opening, the panels B may be cut so that a rough buck or plate 95 may be placed and secured therein as at 96 and the style pieces 97 may be assembled; the header structure 98 being associated therewith in any approved manner.

In Figure 4 is shown a vertical section thru a window opening. The panels B are cut to provide the window opening and receive top double headers 98 in a secured relation between the inner and outer wall bodies of the panels B; the style pieces 100 being assembled in any approved relation. At the bottom of the window opening the wall bodies of the panel sections B receive a single plate 101 to which the sill 102 may be connected, and also the stool 103. The sash structure may of course be assembled in the opening as desired.

Referring to Figure 9A, the corner structure therein is somewhat differently formed than the structure shown in Figure 3. The intersecting corner walls 110 and 111 at this corner are each provided with a complete member $B^5$ in accordance with the structure B above described. The inner panel $B^6$ of the wall 111 is merely provided with one complementary rib or tongue $21^e$ and a body portion $20^e$ which extends flush with the outer edge of the member $B^5$ at the corner. The other wall 110 has a specially constructed board member $B^7$ provided with spaced tongues $21^f$ and an extension $20^f$ complementary overlapping the extreme end of the wall 111, as shown in Figure 9A and completing the corner except for a protecting angle 112 which may be secured at this corner in overlapping relation upon the walls 110 and 111. Securement may be in any approved manner (not shown).

In Figure 14 is shown the application of the improved wallboard member by the formation of a floor and a flat roof. In this form of construction, the vertical wall $B^7$ is of substantially the construction shown for the vertical wall of Figure 1. However, the floor structure $B^8$ is made up of complementary wallboard members B, such as above described, which interfit to provide a floor structure. The material, of course, must be of a nature sufficiently strong to support the desired load. Figure 16 represents a cross sectional view thru this floor structure $B^8$ without any finishing floor surfacing. The floor $B^8$ may be secured as by elements 114 and it may have any approved finishing surface 115, such as linoleum. Molding or other finishing material 116 may also be provided.

The roof structure $B^9$ may also be formed of the interfitting complementary wallboard members B. Figure 16 may also represent a cross sectional view thru this roof structure. It is secured upon the vertical wall $B^7$ by elements 117. It may be marginally finished by suitable structure 118, shown in Figure 14, and a roof covering 119 may be applied if desired. A suitable fascia $57^a$ may be provided.

In Figure 15 is shown a sloping type of roof including a vertical wall structure $B^{10}$ similar to the wall structure in the form of invention shown in Figure 1. The roof structure $B^{11}$ is formed of interfitting members B and Figure 16 may represent a cross section thereof minus the roof finishing cover. The roof structure $B^{11}$ may be secured upon the wall B as by elements 121 and the roof may have a cover or mat 122 of any approved nature.

Figure 17 shows rather diagrammatically a roof $B^{12}$ supported upon vertical wall structures $B^{13}$ and $B^{14}$, all of which are formed of the interfitting members B in the relation above described.

The same reference characters have been given to the elements shown in Figure 16 as applied to the board B of Figures 1, 2 and 3, because the construction thereof is identical insofar as a wall structure, roof structure or floor structure are concerned.

From the foregoing description of this invention it is apparent that a walboard type of vertical wall roof or floor structure may be provided out of standard sections of wallboard modified in accordance with the principles of this invention. It is of course intended that the bodies of the wallboard will be integral with the interfitting tongue structures, and that when said tongue structures are assembled they will in themselves provide studding which will support the desired loads. The wall structure is insulated since the inner and outer body portions are spaced and because the tongues are wedged into shape, the wall structure will be weather-proof. It is intended that the wall panels will form not only the wall, as such, but also a wall surface which may be patterned or grooved as a variation from a flat surface. The finish may be natural texture or it may be painted or papered.

It is obvious from the foregoing that the interlocking wall sections may be used either for outside walls or interior partitions since in either case they are sufficiently strong to carry the loads desired.

Various changes in the shape, size, and arrangement of parts may be made to the form of invention herein shown and described, without departing from the spirit of the invention or the scope of the following claims.

I claim:

1. In a construction for use in the building of walls, the combination of a corner unit of hollow polygonal cross section provided at adjacently disposed sides with tongues spaced from the respective sides to define sockets, said sockets opening inwardly at the juncture of said sides, and walls cooperatively arranged with respect to the corner unit each comprising inner and outer body panels and interfitting studding parts spacing said panels, the inner body panels of each of said walls having adjacent to said corner unit a complementary tongue extending normal to the plane of the respective panel and extending into and fitting in a fixed relation in a socket of the corner unit.

2. In a wall structure the combination of spaced inner and outer wall portions each made up of a plurality of panel sections, each of said panel sections having means extending transversely to the respective planes thereof providing a socket and also flanges extending transversely to the planes thereof and spaced from the socket providing means, and teeth secured upon said flanges, the panels being so arranged with respect to each other that the flanges of the inner wall portions seat in the sockets of the outer wall portion and vice versa, with the teeth of the flanges biting into the material forming the sockets in which seated.

3. In a building construction for use in the establishment of walls the combination of a corner unit having integral therewith at adjacently disposed sides tongues spaced from the sides, said spaces providing sockets which open at the inner corner of the corner unit, and walls cooperatively arranged with respect to the corner unit each comprising inner and outer panel bodies integral therewith on the facing surfaces thereof vertically extending flanges and intermediate socket providing studs, said flanges and studs being arranged normal to the plane of the respective bodies and the flanges of the inner panel bodies being interfitted in the stud sockets of the outer panel bodies and vice versa throughout the width of said walls, the inner panel bodies immediately adjacent to the corner unit having flanges extending normal to the planes of the respective panel bodies and interfitting in fixed relation in the sockets of the corner unit aforesaid.

ROY W. ANDERSON.

REFERENCES CITED

The following references are of record in the file of this patent:

UNITED STATES PATENTS

| Number | Name | Date |
|---|---|---|
| 345,944 | Anderfuren | July 20, 1886 |
| 471,610 | Hart | Mar. 29, 1892 |
| 1,375,103 | Needham | Apr. 19, 1921 |
| 1,987,828 | Horn | Jan. 15, 1935 |
| 1,998,049 | Fulton | Apr. 16, 1935 |
| 2,071,039 | Leemhuis | Feb. 16, 1937 |
| 2,082,431 | Tripp | June 1, 1937 |
| 2,151,384 | Horn | Mar. 21, 1939 |
| 2,267,330 | Goss | Dec. 23, 1941 |
| 2,407,004 | Guignon, Jr. | Sept. 3, 1946 |
| 2,413,362 | Maxwell et al. | Dec. 31, 1946 |

FOREIGN PATENTS

| Number | Country | Date |
|---|---|---|
| 91,830 | Sweden | of 1938 |
| 542,586 | Great Britain | of 1942 |